United States Patent [19]
Maggio et al.

[11] Patent Number: 5,959,417
[45] Date of Patent: Sep. 28, 1999

[54] CURRENT FEEDBACK AMPLIFIER HAVING TRIMCIRCUITRY AND METHOD FOR CONTROLLING AND EQUALIZING STATOR WINDING CURRENT

[75] Inventors: Kenneth J. Maggio; Rolf Lagerquist, both of Dallas, Tex.

[73] Assignee: Texas Instruments Incorporated, Dallas, Tex.

[21] Appl. No.: 08/937,219

[22] Filed: Sep. 18, 1997

Related U.S. Application Data

[60] Provisional application No. 60/025,746, Sep. 20, 1996.

[51] Int. Cl.$^6$ .................................................. H02K 23/00
[52] U.S. Cl. ........................... 318/254; 318/432; 318/439; 324/772
[58] Field of Search .................................... 318/138, 139, 318/245–293, 430–436, 490, 439; 324/772, 713, 545, 546

[56] References Cited

U.S. PATENT DOCUMENTS

| | | | |
|---|---|---|---|
| 4,384,243 | 5/1983 | Muskovac | 318/729 |
| 5,331,259 | 7/1994 | Naito | 318/254 |
| 5,378,967 | 1/1995 | Naito | 318/254 |
| 5,493,189 | 2/1996 | Ling et al. | 318/254 |
| 5,585,701 | 12/1996 | Kaida et al. | 318/254 |
| 5,614,797 | 3/1997 | Carobolante | 318/432 |
| 5,656,897 | 8/1997 | Carobolante et al. | 318/254 |
| 5,661,383 | 8/1997 | Schlager et al. | 318/439 |
| 5,773,991 | 6/1998 | Chen | 324/772 |

FOREIGN PATENT DOCUMENTS

| | | |
|---|---|---|
| 0572162 | 12/1993 | European Pat. Off. . |
| 0731555 | 9/1996 | European Pat. Off. . |

*Primary Examiner*—Paul Ip
*Attorney, Agent, or Firm*—W. Daniel Swayze, Jr.; Wade James Brady, III; Richard L. Donaldson

[57] ABSTRACT

A current feedback amplifier (12) is provided for controlling a stator winding phase current in a polyphase stator winding, such as a three-phase stator winding (10), of a polyphase direct current motor. The current amplifier (12) includes a first stage current feedback amplifier C (27) and a second stage current feedback amplifier (100) coupled through a switch (101). The first stage current feedback amplifier C (27) detects a stator winding phase current $I_{AB}$ flowing through a C-coil (15) of the three-phase stator winding (10) and generates an equalized sense current $I_{senseT}$ in response that is related to $I_{AB}$. The equalized sense current $I_{senseT}$ is generated using a phase trim FET (31) and an adjustable phase trim FET (32). The second stage current feedback amplifier (100) receives $I_{senseT}$ from the first stage current feedback amplifier C (27) and generates a control signal. This may be done by comparing $I_{senseT}$ to an amplitude adjusted reference current $I_{refT}$. The amplitude adjusted reference current $I_{refT}$ is generated using an amplitude trim FET (81) and an adjustable amplitude trim FET (82). The second stage current feedback amplifier (100) provides the control signal to a driver circuit for controlling the stator winding phase current. The second stage current feedback amplifier (100) may sequentially or commutatively couple to other first stage current sense amplifiers, such as a first stage current feedback amplifier B (30) or a first stage current feedback amplifier A (28), to control other stator winding phase currents to generate equalized, amplitude adjusted stator winding phase currents.

23 Claims, 3 Drawing Sheets

CURRENT FEEDBACK AMPLIFIER HAVING TRIMCIRCUITRY AND METHOD FOR CONTROLLING AND EQUALIZING STATOR WINDING CURRENT

This application is a continuation of provisional application Ser. No. 60/025,746, filed Sept. 20, 1996.

TECHNICAL FIELD OF THE INVENTION

This invention relates generally to the field of control circuitry and more particularly to a current feedback amplifier having trim circuitry and a method for controlling and equalizing the stator winding current in a polyphase direct current motor.

BACKGROUND OF THE INVENTION

A variety of applications use polyphase direct current (dc) motors for providing rotational motion. In particular, applications such as hard disk drives and CD-ROM drives often use polyphase dc motors, such as three-phase dc motors, to rotate information platters including the magnetic disks of a hard disk drive. The control of the rotational speed of these information platters is often critical to overall application performance.

The rotational speed of these polyphase dc motors is controlled through the current applied to the stator windings or coils. For example, the stator windings of a three-phase dc motor may be coupled in a "Y" configuration and include an A-coil, a B-coil, and a C-coil coupled at one end at a center tap node. The remaining ends of each coil are selectively coupled to either a high side driver, a low side driver, or to an open circuit as commutation occurs. The drivers may be power transistors that are implemented as, for example, field-effect transistors (FET).

During steady state operation, current flows from a supply source coupled to the high side driver, through the high side driver, through a first coil coupled to the high side driver, through the center tap, through a second coil coupled to the low side driver, and through the low side driver which is also coupled to ground. During this time, a third coil couples to the center tap on one end and to an open circuit at the other end so that current does not flow through the third coil. After a period of time, a commutation occurs so that current may now flow through the third coil and either the first coil or the second coil depending on the commutation sequence. A commutation is the transfer of current from one path in a circuit to another. Thus, current flows through two of the three coils during a steady state operation until a commutation occurs, at which time, current then flows through one of the two coils and the third coil until the next commutation occurs.

A total of six currents may be provided in the stator windings of a three-phase dc motor through six commutations. The currents, for example, may be provided through the stator coils in the following current flow path sequence to impart rotational motion to the rotor of the three-phase dc motor: A-coil to C-coil, A-coil to B-coil, C-coil to B-coil, C-coil to A-coil, B-coil to A-coil, and B-coil to C-coil.

The current flows are controlled by the high and low side drivers provided at each phase of the stator windings. A commutation circuit sequentially applies control voltages to the gates of the respective high and low side drivers to cause the current to flow in the stator windings in a predetermined sequence such as is described above.

The currents in the respective current flow paths are desirably equal. However, due to variations in fabrication processes, mask alignments, and so on, the FET driver transistors, in the respective current flow paths, typically have variances and tolerances in such dimensions as the channel widths or lengths. These variances and tolerances result in inequalities in the currents in the respective current flow paths in the stator windings. As a result of these inequalities, audible noises, torque ripple, motor inaccuracies, and other undesirable effects may occur. Such unequal currents also reduce the precision of the motor speed. As data densities of hard disk drives become greater and greater, such imprecisions result in limitations on the data densities that might be achieved in a particular hard disk drive.

The stator winding currents may be detected and controlled using a control circuitry at each phase of the stator windings. This is generally performed at the low side driver transistors at each phase of the stator windings. This control circuitry may include transistor FET devices connected as current mirrors to mirror the current in the FET driver transistors. Problems arise when the ratio of the size of the driver transistor to the mirror transistors is too small. If the ratio of the size of the driver transistor to the mirror transistors is too small, a large amount of power is wasted in the control circuitry because of the large current in the mirror transistors.

However, other problems are created when the ratio becomes too large. For example, a ratio on the order of 1500:1 reduces current mirror accuracy because of variances and tolerances that exist when fabricating mirror transistors of this size. The ratio can be expected to vary on a lot and device basis. Additionally, when the ratio becomes too large, these fabrication variances and tolerances introduce differences between the mirror transistors used in the control circuitry at each phase of the stator windings. This may ultimately contribute to the unequal current flows in the stator windings resulting in the problems mentioned above of audible noises, torque ripple, motor inaccuracies, and other undesirable effects. The audible noise may be in the 2–4 kHz range, which is a typical commutation frequency.

Furthermore, problems may also arise when the current flows in the stator windings are equivalent but at an undesirable amplitude. For example, if the current flows are too low, the motor may not provide the desired torque or rotational velocity.

SUMMARY OF THE INVENTION

From the foregoing it may be appreciated that a need has arisen for a current feedback amplifier having trim circuitry that serves as the control circuitry at each phase of the stator windings to control the current in the coils of the stator windings of a polyphase dc motor to ensure that the currents are somewhat equivalent and at a desired amplitude while minimizing power consumption. In accordance with the present invention, a current feedback amplifier having trim circuitry and a method for controlling and equalizing current in the stator windings are provided which substantially eliminate the disadvantages and problems outlined above. The present invention uses a plurality of programmably selectable transistors or active devices that serve as trim circuitry to balance or eliminate the problems caused by circuitry variances and tolerances that exist when fabricating mirror transistors and circuitry of a small size.

According to the present invention, a current feedback amplifier is provided to control a stator winding phase current in a polyphase stator winding of a polyphase direct current motor. Each phase or stator coil of the polyphase stator winding has a driver circuit, such as a power field-effect transistor, that receives a control signal generated by the current feedback amplifier to control the stator winding phase current. The current feedback amplifier includes a first stage current sense amplifier and a second stage current sense amplifier. The first stage current sense amplifier detects the stator winding phase current flowing through a first phase of the polyphase stator winding and generates an equalized sense current in response. This may be accomplished using circuitry functioning as a current mirror to generate a sense current that is related to the stator winding phase current. The sense current may then be equalized using a phase trim device in a current mirror circuitry. The phase trim device may be an adjustable or selectable device that is programmably set to a desired value to ensure that the proper equalized sense current is generated. The second stage current sense amplifier receives the equalized sense current from the first stage current sense amplifier and generates the control signal by comparing the equalized sense current to an amplitude adjusted reference current. The second stage current sense amplifier then provides the control signal to the driver circuit for controlling the stator winding phase current at a desired level.

The present invention provides various technical advantages. A technical advantage of the present invention includes equal currents in the stator windings of a polyphase dc motor. This reduces or eliminates torque ripple, audible noises caused by resonant frequencies because of the unequal currents, and motor inaccuracies. Another technical advantage of the present invention includes improved motor speed precision allowing for increased data densities in hard disk drive applications. Yet another technical advantage includes the use of driver transistors and current mirror transistors in the control circuitry for sensing the current through the driver transistors that are sized relative to one another to reduce power consumption of the control circuitry while still providing accuracy and minimizing overall circuitry. Still another technical advantage includes stator winding currents having a desired amplitude. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

Figure 1:
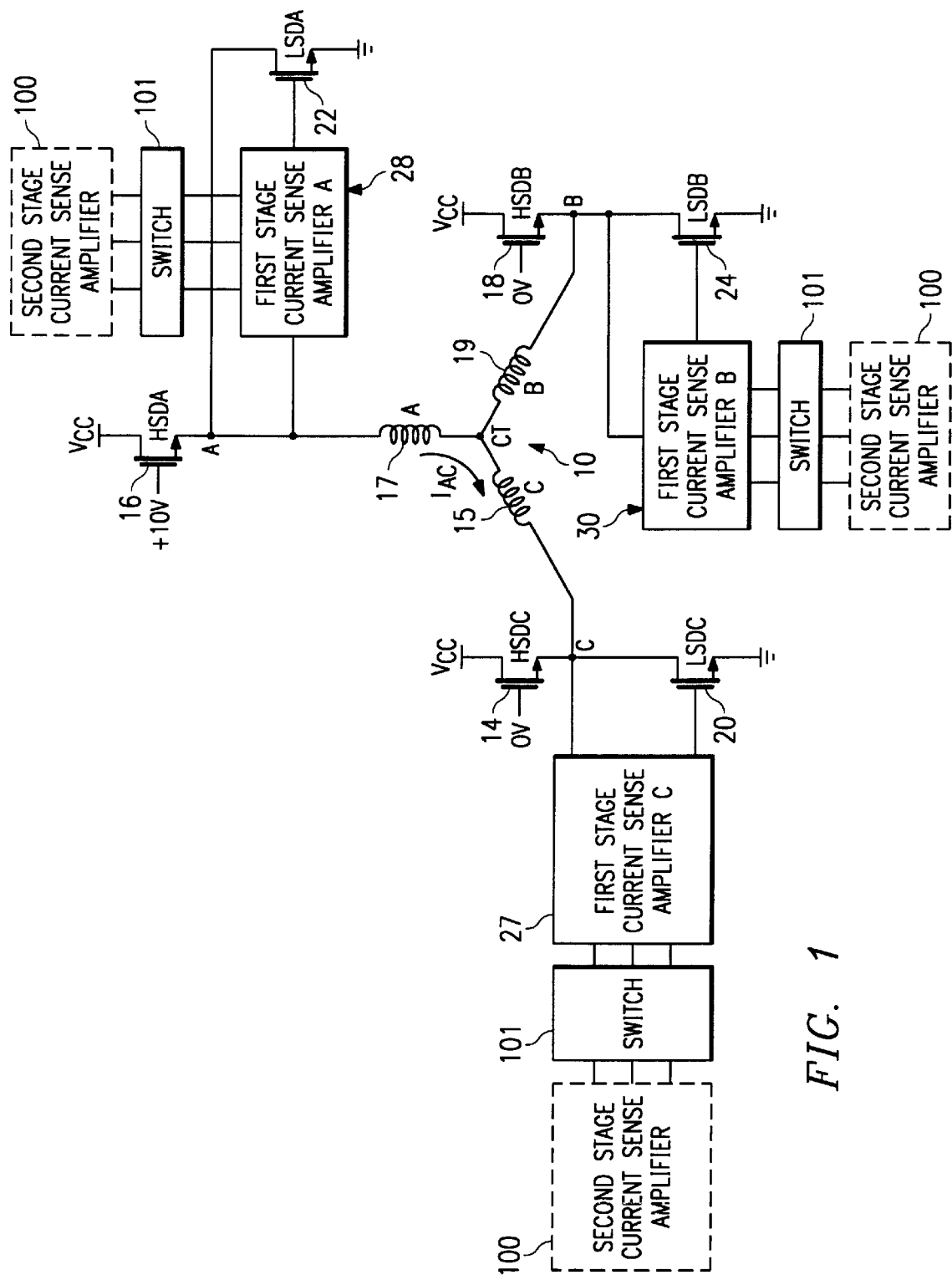
FIG. 1 is a circuit diagram illustrating a three-phase stator winding with driver transistors and a current feedback amplifier circuitry configured to regulate a steady state current $I_{AC}$.

FIG. 1 is a circuit diagram illustrating a three-phase stator winding 10 including various driver transistors and a current feedback amplifier circuitry configured to regulate the steady state current $I_{AC}$. It should be noted at the outset that although a three-phase stator winding 10 of a three-phase motor is shown and described, the present invention is not limited to any particular number of phases or particular modes of operation. Three-phase stator winding 10 is coupled in a "Y" configuration and includes an A-coil 17, a B-coil 19, and a C-coil 15. The three coils couple together at a center tap node on one end and each of the three coils couple to a respective high side driver transistor and a low side driver transistor at the other end. The high side driver transistors may be implemented using field-effect transistors (FETs), such as n-channel MOSFETs, that operate as switches. The low side driver transistors may be implemented as FETs, such as n-channel MOSFETs, that operate in the saturation region to regulate a current being provided through the coil coupled to the low side driver. High side driver A (HSDA) 16 and low side driver A (LSDA) 22 couple to A-coil 17 at node A, while high side driver B (HSDB) 18 and low side driver B (LSDB) 24 couple to B-coil 19 at node B. High side driver C (HSDC) 14 and low side driver C (LSDC) 20 couple to C-coil 15 at node C.

A commutator circuit, not shown in FIG. 1, selectively activates combinations of the high side driver transistors and low side driver transistors to produce current flows through selected pairs of the coils of three-phase stator winding 10, such as $I_{AC}$. This produces the rotation of the rotor, not shown in FIG. 1, in a known fashion. The currents flow from $V_{CC}$, through a selected high side driver, through a first coil coupled to the selected high side driver, through the center tap, through a second coil coupled to a selected low side driver, through the selected low side driver, and then to ground.

In the embodiment illustrated in FIG. 1, the coil current is controlled or adjusted by regulating the gate-to-source voltage of the selected low side driver. For example, when steady state stator current $I_{AC}$ is provided through A-coil 17 and C-coil 15, the commutator circuit uses HSDA 15 and LSDC 20 as the driver transistors. HSDA 15 acts as a closed switch or short circuit by providing ten volts to its gate so that current may flow from $V_{CC}$ to A-coil 17 through node A. LSDC 20 controls or regulates steady state current $I_{AC}$ by operating in the saturation region and allowing current to flow from is A-coil 17, through the center tap, through C-coil 15 to node C, and through LSDC 20 to ground by regulating the gate-to-source voltage of LSDC 20. During this time, the gate-to-source voltage of LSDC 20 is controlled or regulated through a control signal generated by a control circuitry that includes a first stage current sense amplifier C 27 and a second stage current sense amplifier 100 coupled through a switch 100. This control circuitry is illustrated in detail in FIGS. 2, 3, and 4 and is described more fully below. LSDA 22 and LSDB 24 are not turned on during this time and serve as open circuits from drain-to-source, and HSDC 14 and HSDB 18 operate as open switches by providing zero volts to their gates which results in an open circuit condition. A first stage current sense amplifier A 28 and a first stage current sense amplifier B 30 also are decoupled from nodes A and B, respectively, during this time.

During other commutation states when the commutation circuitry selects a different low side driver, such as LSDB 24 or LSDA 22, second stage current sense amplifier 100 couples to the first stage current sense amplifier already coupled to the selected low side driver. For example, when steady state stator current $I_{AC}$ is regulated through A-coil 17 and B-coil 19, LSDB 24 serves as the low side driver. As a result, second stage current sense amplifier 100 couples to first stage current sense amplifier B 30 through switch 101 to regulate the gate-to-source voltage of LSDB 24. Thus, the regulation or control of the gate-to-source voltage of the selected low side driver transistor is accomplished using control circuitry including second stage current sense amplifier 100 and the selected first stage current sense amplifier. The control of the gate-to-source voltage by the control circuitry ensures that the stator winding currents are somewhat equivalent. Each of the first stage current sense amplifiers are similarly constructed and couple to second stage current sense amplifier 100 when needed. In this manner, overall circuitry is reduced and matching improved.

Thus, there are six possible combinations of current flow paths using three-phase stator winding 10. For example, current may flow in the following manner and sequence: A-coil 17 to C-coil 15; A-coil 17 to B-coil 19; C-coil 15 to B-coil 19; C-coil.18 to A-coil 17; B-coil 19 to A-coil 17; and B-coil 19 to C-coil 15. In the operation of a three-phase dc motor, each of these six current flows are established in a set sequence as current is switched from coil-to-coil by the commutator circuit to establish and provide rotation to the rotor. It is desirable to ensure that each of the six current flows are equivalent and are provided at a desired amplitude to reduce torque ripple, audible noises, and other undesirable effects while increasing motor precision and minimizing power consumption.

This may be achieved, as described below, by ensuring that the control circuitry, such as the first stage current sense amplifiers at each phase, is properly designed, sized, and adjusted or programmed relative to the corresponding low side driver to ensure that the stator winding coil currents may be accurately measured and controlled to provide equivalent stator winding currents. This may be accomplished by using programmably adjustable phase trim circuitry in the first stage sense current amplifier circuits to ensure phase-to-phase equivalent stator winding currents and programmably adjustable amplitude trim circuitry in second stage current sense amplifier 100 to adjust the amplitude of the stator winding currents to a desired or required level. The programming or adjustment of the programmably adjustable phase trim circuitry and the programmably adjustable amplitude trim circuitry is normally performed during circuitry testing.

After fabrication of the first stage current sense amplifiers 27, 28, 30 and second stage current sense amplifier 100, this control circuity is coupled to three-phase stator winding 10 and circuitry testing and adjustment are performed. In order to ensure that the stator winding currents in each of a plurality of stator winding current flow paths will be substantially equal during steady state operation, the following procedure is performed. The adjustments described below may be made by calculation or by trial and error.

First steady state stator winding current, such as $I_{AC}$, is measured, recorded, and serves as a reference current. Next, successive steady state stator currents are measured and adjusted to correspond to the reference current. The adjustments are made to the circuitry of the remaining first stage current sense amplifiers, such as 30 and 28, that are used as part of the control circuitry to regulate a particular steady state stator current. Specifically, an adjustable phase trim circuitry is adjusted in these first stage current sense amplifiers until the corresponding steady state stator current is equivalent or somewhat equivalent to the reference current. This adjustable phase trim circuitry may be programmable circuitry so that the desired equalization settings are stored in a memory device, such as an EEPROM.

Once the steady state stator currents are equalized, the amplitude of all of the steady state stator currents may be adjusted to a desired amplitude. This is accomplished by setting adjustable amplitude trim circuitry provided in second stage current sense amplifier 100 which couples at different times to each of the first stage sense amplifiers during actual operation to control the stator currents. Specifically, an adjustable amplitude trim circuitry is adjusted, for any of the steady state stator currents, until the desired amplitude is achieved. Because the other steady state stator currents have already been equalized, the desired amplitude should now be generated by all steady state stator currents. The adjustable amplitude trim circuitry may be programmable circuitry so that the desired amplitude settings are stored in a memory device, such as an EEPROM.

Figure 2:
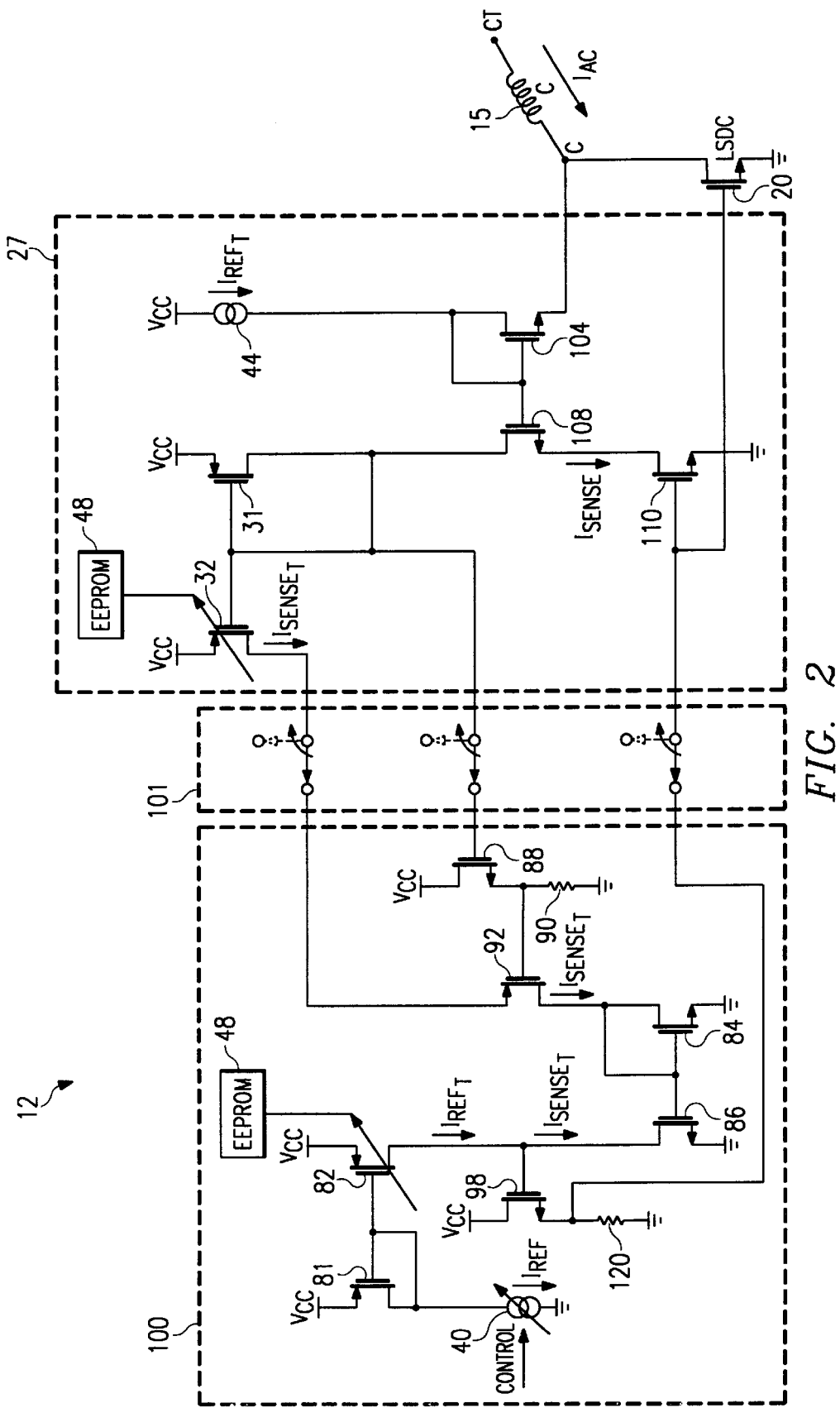
FIG. 2 is a circuit diagram illustrating an embodiment of the current feedback amplifier.

FIG. 2 is a circuit diagram illustrating an embodiment of a current feedback amplifier 12 that includes second stage current sense amplifier 100 coupled to first stage current sense amplifier C 27 through switch 101. Current feedback amplifier 12 functions as a control circuitry to control steady state stator current $I_{AC}$ by controlling the gate-to-source voltage of LSDC 20. Current feedback amplifier 12 is an exemplary circuit and each current feedback amplifier circuit that includes the combination of second stage current sense amplifier 100 and another first stage current sense amplifier (such as either first stage current sense amplifier 28 or 30 of FIG. 1) is similarly constructed.

First stage current sense amplifier C 27 couples to C-coil 15 at node C, to the gate of LSDC 20, and to second stage current sense amplifier 100 through switch 101. Switch 101 couples first stage current sense amplifier C 27 to second stage current sense amplifier 100 when LSDC 20 serves as a low side driver to three-phase stator winding 10. This occurs, for example, when $I_{AC}$ is being provided though C-coil 15. First stage current sense amplifier C 27 mirrors steady state stator current $I_{AC}$ and equalizes the mirrored current to generate an equalized sense current that is provided to second stage current sense amplifier 100.

First stage current sense amplifier C 27 includes a sense current mirror circuitry that detects or mirrors $I_{AC}$ and generates a mirrored current $I_{sense}$ in response, and an equalized sense current mirror circuitry that generates the equalized sense current $I_{senseT}$ in response to receiving $I_{sense}$. The sense current mirror circuitry includes a sense FET 110, a FET 108, and a FET 104 configured to function like a cascoded current mirror so that $I_{sense}$ will be generated through FET 110 and FET 108 as an accurate mirrored current of $I_{AC}$. In an alternative embodiment, when the voltage $V_C$ at node C approaches $V_{CC}$, the effectiveness of the cascode arrangement is greatly reduced and the gate of FET 104 can be pulled to $V_{CC}$ to improve the accuracy of the sense current mirror circuitry in generating $I_{sense}$. Sense FET 110, FET 108, and FET 104 are all illustrated as n-channel MOSFETs, however, any of a variety of other transistor types or circuitry technology could be implemented instead.

Sense FET 110 and LSDC 20 are coupled at their gates and both are coupled to ground at their sources. The gate-to-source voltage is controlled by a control signal generated by second stage current sense amplifier 100 and provided through switch 101. FET 108 couples to the drain of sense FET 110 through its source, and FET 104 couples to the drain of LSDC 20 through its source in an attempt to mirror the voltage $V_C$ at the drain of FET 110. FET 108 and FET 104 couple at their gates, and FET 104 couples its gate and drain. Current source 44 provides a current $I_{refT}$ to the drain of FET 104 to establish a voltage to drive the gates of FET 108 and FET 104. $I_{refT}$ is generated by a variable current source 40 of second stage current sense amplifier 100 and is described below. The ratio of the channel widths of LSDC 20 to sense FET 110 is large to provide $I_{sense}$ as a scaled version of $I_{AC}$, thus saving power. For example, the channel width ratios may be provided at 10,000:1. However, the fabrication of small channel widths may introduce some variances in the circuitry resulting in the inaccurate generation of $I_{sense}$ and differences in the generation of $I_{sense}$ between the first stage current sense amplifiers which ultimately results in stator winding currents with different values.

To compensate for this, the equalized sense current mirror circuitry is provided to generate the equalized sense current $I_{senseT}$, in response to receiving $I_{sense}$, at a value that will ultimately compensate for any problems caused by fabrication variances. The equalized sense current mirror circuitry includes a phase trim FET 31, implemented as a p-channel MOSFET, an adjustable phase trim FET 32, implemented using p-channel MOSFET devices and shown more fully in FIGS. 3 and 4, and an EEPROM 48. EEPROM 48 is configured with equalization settings which, as discussed with reference to FIG. 1, normally are established and loaded (or programmed) at the time of testing. The equalization settings define the number of discrete FETs that will be included as part of adjustable phase trim FET 32 to effectively change the channel width ratio between phase trim FET 31 and adjustable phase trim FET 32. This change in the channel width ratio ultimately results in an equalized sense current $I_{senseT}$ that results in equivalent or somewhat equivalent stator winding currents. The combination of adjustable phase trim FET 32 and EEPROM 48 may be referred to as a programmably adjustable phase trim device.

Equalized sense current $I_{senseT}$ is provided to second stage current sense amplifier 100 through switch 101 through the drain of adjustable phase trim FET 32. The gates of adjustable phase trim FET 32 and phase trim FET 31 are also provided to second stage current sense amplifier 100 through switch 101. Second stage current sense amplifier 100 includes an input circuitry, a mirror circuitry, and a reference current mirror circuitry for generating the control signal that controls the gate-to-source voltage of LSDC 20 and, hence, ultimately $I_{AC}$. The input circuitry includes an n-channel FET 88, a resistor 90, and a p-channel FET 92 for receiving equalized sense current $I_{senseT}$ and ensuring that $I_{senseT}$ is provided to the mirror circuitry. In effect, the coupling of n-channel FET 88, resistor 90, and p-channel FET 92 is designed to cascode the equalized sense current mirror circuitry of first stage current sense amplifier C 27.

The mirror circuitry includes a FET 84 and a FET 86 that are implemented as n-channel MOSFETs coupled as a current mirror. The mirror circuitry mirrors equalized sense current $I_{senseT}$ through FET 86.

The reference current mirror circuitry is used to generate the control signal that is provided to the gate of LSDC 20 to control stator current $I_{AC}$. The reference current mirror circuitry generates an amplitude adjusted reference current $I_{refT}$ at the gate node of regulating FET 98 such that the gate voltage of FET 98 is proportional to $I_{refT}$ minus $I_{senseT}$. The gate node of regulating FET 98 may be referred to as a summing node since the result is based on the comparison of two currents in the manner just mentioned. This then results in the generation of the control signal that is provided from the source of regulating FET 98 to the gate of LSDC 20. Resistor 120 couples between the source of regulating FET 98 and ground. As mentioned above, $I_{refT}$ may also serve as a current source at the drain of FET 104 in effecting a cascode to the sense current mirror circuitry of first stage current sense amplifier 27.

When the amplitude of the adjusted reference current $I_{refT}$ is greater than $I_{senseT}$ the value of the control signal increases. When the amplitude of the adjusted reference current $I_{refT}$ is less than $I_{senseT}$, the value of the control signal decreases. As the circuit settles into a steady state, these two currents are equal.

The reference current mirror circuitry generates amplitude adjusted reference current $I_{refT}$ using an amplitude trim FET 81, implemented as a p-channel MOSFET, an adjustable amplitude trim FET 82, implemented using p-channel MOSFET devices, EEPROM 48, and a variable current source 40 that is controlled by an external control line. The external control line may be provided by a commutator circuit, not shown. The variable current source 40 provides $I_{ref}$ to amplitude trim FET 81 so that $I_{refT}$ can be mirrored through adjustable amplitude trim FET 82. The amplitude adjusted reference current $I_{refT}$ is generated and provided in the same manner to all first stage current sense amplifiers to ensure that all of the equalized stator winding currents are provided at a desired level. EEPROM 48 is configured with the desired amplitude settings which, as discussed with reference to FIG. 1, are normally established and loaded (or programmed) at the time of testing. The amplitude settings determine which of the discrete FETs of adjustable amplitude trim FET 82 will be included as part of adjustable amplitude trim FET 82 to effectively change the channel width ratio between amplitude trim FET 81 and adjustable amplitude trim FET 82. As previously discussed, this ratio change ultimately results in stator winding currents all having the desired amplitude. The combination of adjustable amplitude trim FET 82 and EEPROM 48 may be referred to as a programmably adjustable amplitude trim device.

In operation, current feedback amplifier 12 functions as a control circuitry for controlling stator current $I_{AC}$. Current feedback amplifier 12 detects stator current $I_{AC}$ and generates mirrored current $I_{sense}$ using the sense current mirror circuitry of first stage current sense amplifier C 27. Next, current feedback amplifier 12 equalizes the sense current to generate an equalized sense current $I_{senseT}$ using the equalized sense current mirror circuitry of first stage current sense amplifier C 27. The equalized sense current circuitry includes phase trim FET 31, adjustable phase trim FET 32, and EEPROM 48 configured with equalization settings. $I_{senseT}$ is then provided to second stage current sense amplifier 100 for further processing.

Second stage current sense amplifier 100 mirrors $I_{senseT}$ to the gate of regulating FET 98 using the input circuitry and the mirror circuitry. Second stage current sense amplifier 100 also generates trimmed or adjusted reference current $I_{refT}$ and provides this current, in the opposite direction, to the gate of regulating FET 98 where they can be subtracted, or compared, to generate the control signal that controls the gate-to-source voltage of LSDC 20 and, hence, ultimately $I_{AC}$. This is done using the reference current mirror circuitry that includes amplitude trim FET 81, adjustable amplitude trim FET 82, EEPROM 48 preconfigured with the desired amplitude settings, and variable current source 40.

Figure 3:
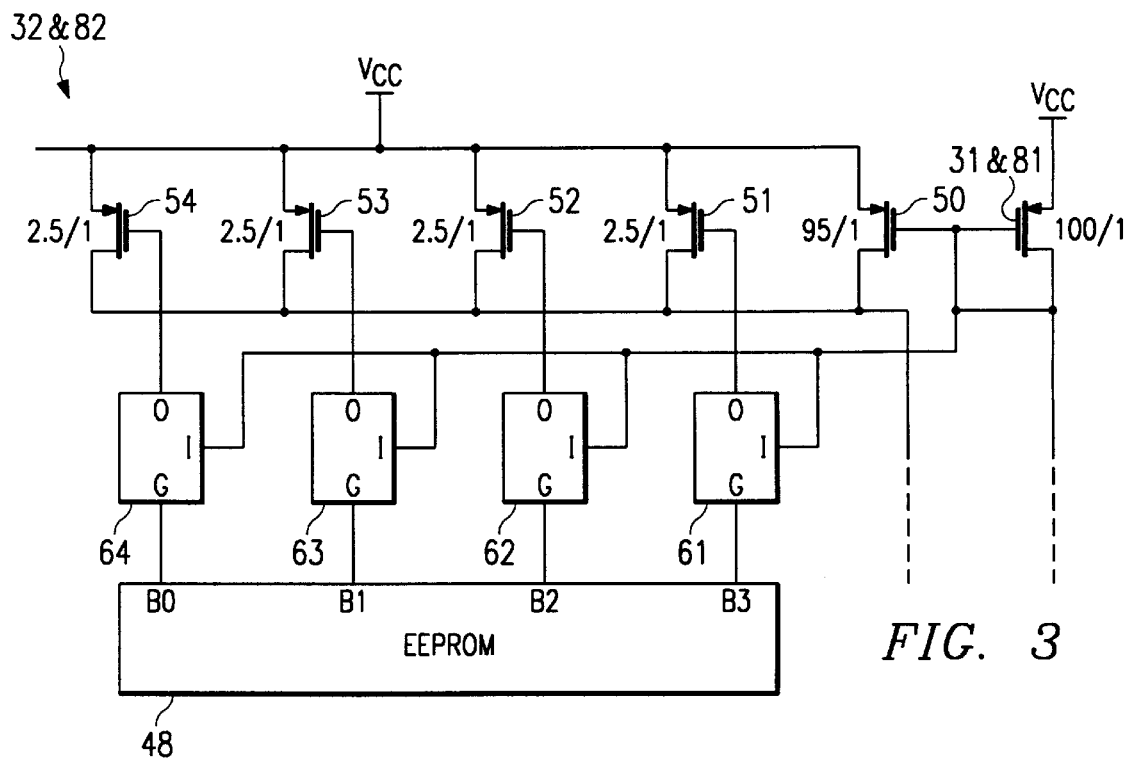
FIG. 3 is a circuit diagram illustrating a trim circuitry.

FIG. 3 is a circuit diagram illustrating a trim circuitry that may be implemented as the equalized sense current mirror circuitry of first stage current sense amplifier C 27, or as the reference current mirror circuitry of second stage current sense amplifier 100. The equalized sense current mirror circuitry is the combination of phase trim FET 31, adjustable phase trim FET 32, and EEPROM 48. The reference current mirror circuitry is the combination of amplitude trim FET 81, adjustable amplitude trim FET 82, and EEPROM 48. The trim circuitry is used to generate a trimmed or adjusted current having a desired value in response to receiving another current. For example, the equalized sense current mirror circuitry receives mirrored current $I_{senseT}$ at phase trim FET 31 and generates equalized sense current $I_{senseT'}$ at adjustable phase trim FET 32 in response. Similarly, the reference current mirror circuitry receives reference current $I_{ref}$ at amplitude trim FET 81 and generates amplitude adjusted reference current $I_{refT}$ at adjustable amplitude trim FET 82 in response.

The desired current is generated or mirrored by selecting a set of trim FETs from an adjustable FET, such as adjustable phase trim FET 32 or adjustable amplitude trim FET 82, through the use of a memory device, such as EEPROM 48. By selecting a set of trim FETs from an adjustable FET, the effective channel width ratio between the adjustable FET and a non-adjustable FET, such as phase trim FET 31 or amplitude trim FET 81, may be established to effect the generation of the desired current.

The adjustable FET, in the one embodiment of FIG. 3, includes a first trim FET 50, a second trim FET 51, a third trim FET 52, a fourth trim FET 53, and a fifth trim FET 54 that all couple together at their drains and at their sources to $V_{CC}$. First trim FET 50 and a non-adjustable FET couple directly through their gates, and thus, first trim FET 50 will always be included in the set of trim FETs of the adjustable FET. The gates of second trim FET 51, third trim FET 52, fourth trim FET 53, and fifth trim FET 54 are selectively and switchably coupled to the gate of first trim FET 50 such that when they are coupled, they are coupled in parallel. These trim FETs are switchably coupled through respective switches that include a second switch 61, a third switch 62, a fourth switch 63, and a fifth switch 64. These switches are controlled by EEPROM 48 which may provide a digital signal to control the switching of the trim FETs.

The effect of switching of the trim FETs affects the channel width ratio between the adjustable FET and the non-adjustable FET, such as phase trim FET 31 or amplitude trim FET 81. For example, if only second trim FET 51 is selected, the effective channel width ratio is 97.5:100. If both second trim FET 51 and third trim FET 52 are selected, the effective channel width ratio is 100:100. If all of the trim FETs of FIG. 3 are selected, the effective channel width ratio is 105:100.

As previously discussed, the determination of which trim FETs will be selected is normally done at the time of testing and this selection information is stored in EEPROM 48. With respect to the equalized sense current mirror circuitry, this selection information may be referred to as equalization settings and as amplitude settings with respect to the reference current mirror circuitry. Although five trim FETs are illustrated in FIG. 3 as part of the adjustable FET, it should be understood that is for illustrative purposes only and number of trim FETS having various channel widths may be employed, depending on the resolution and adjustments desired. It should be noted that although one aspect of the invention is aimed at making the currents in all of the stator winding current flow paths substantially equal, the discrete trimming by selective switching into a parallel circuit of one or more transistors or FETs necessarily results in quantized steps in trimming the circuitry. Consequently, the number of transistors that are switchably connected controls the resolution in which the currents can be made equal. Also, the switches used to interface EEPROM 48 with the first through fifth trim FETs may be implemented as part of the EEPROM, as part of the trim FETs, or separately.

Figure 4:
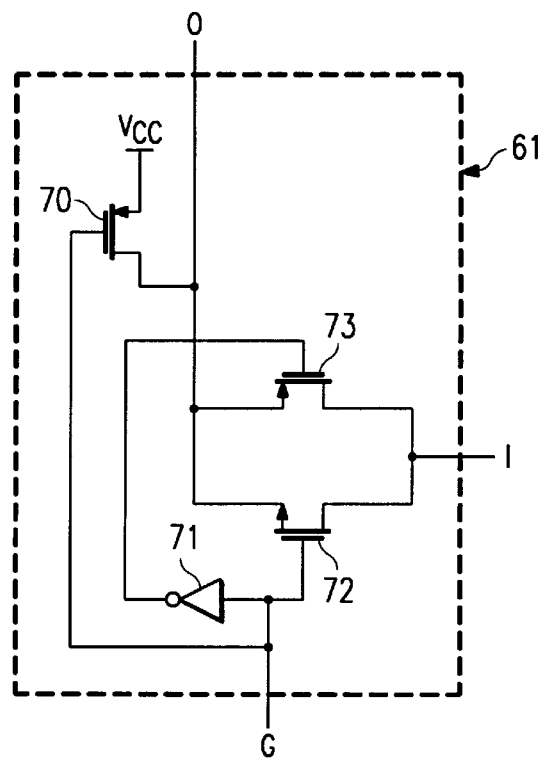
FIG. 4 is a circuit diagram illustrating a trim switch used in the trim circuitry.

FIG. 4 is a circuit diagram illustrating a trim switch implemented as second switch 61. Although only second switch 61 is shown and described, each of the switches 61 through 64 are substantially similar to the other switches; consequently, only second switch 61 is shown. Second switch 61 has three input terminals, labeled G, I, and O. The input, I, couples with the gate of first trim FET 50, and the output, O, couples to the gate of second trim FET 51. Terminal G couples to output B1 of EEPROM 48. The signal provided at the output B1 determines whether or not input, I, couples to output, O, resulting in the coupling of first trim FET 50 and second trim FET 51 at their gates.

If the signal provided to terminal G is low or unenabled, the p-channel transistor 70 will be turned on, forcing the output on line O to high. On the other hand, if the signal provided to input terminal G is high or enabled, the p-channel transistor 70 will be turned off, allowing the signal on the input terminal I to be passed via n-channel transistor 72 and p-channel transistor 73 directly to the output terminal O. Inverter 71 is used to ensure that p-channel transistor 73 is turned on when the signal provided to terminal G is high or enabled.

Thus, it is apparent that there has been provided, in accordance with the present invention, a current feedback amplifier having trim circuitry and a method for controlling and equalizing the stator winding current in a polyphase direct current motor that satisfy the advantages set forth above. Although the preferred embodiment has been described in detail, it should be understood that various changes, substitutions, and alterations can be made herein without departing from the scope of the present invention. For example, although the present invention has been illustrated and described with respect to controlling the currents in the stator windings of a three-phase dc motor, the present invention is not limited to applications involving only three-phase dc motors. Also, even though the present invention has been described and shown as being implemented using n-channel and p-channel FETs, it should be understood that other transistor or related technology, or combinations thereof, may be used in the present invention. For example, the present invention may be implemented by one of ordinary skill in the art using a variety of other technologies such as bipolar junction transistor technology.

The circuits described and illustrated in the preferred embodiment as discrete or separate circuits may be combined into one circuit or split into separate circuits without departing from the scope of the present invention. Furthermore, the direct connections illustrated herein could be altered by one skilled in the art such that two devices are merely coupled to one another through an intermediate device or devices without being directly connected while still achieving the desired results demonstrated by the present invention. Other examples of changes, substitutions, and alterations are readily ascertainable by one skilled in the art and could be made without departing from the spirit and scope of the present invention as defined by the following claims.

What is claimed is:

1. A current feedback amplifier circuit for use in controlling a stator winding phase current in a polyphase stator winding of a polyphase direct current motor, each phase or stator coil of the polyphase stator winding having a driver circuit, the current feedback amplifier circuit comprising:

a first stage current sense amplifier for detecting a stator winding phase current flowing through a first phase of the polyphase stator winding and to generate an equalized sense current in response, the equalized sense current related to the stator winding phase current; and a second stage current sense amplifier for receiving the equalized sense current from the first stage current sense amplifier and to generate a control signal by comparing the equalized sense current to an amplitude adjusted reference current, the second stage current sense amplifier operable provide the control signal to a driver circuit for controlling the stator winding phase current.

2. The current feedback amplifier circuit of claim 1, wherein the driver circuit is a power field-effect transistor having a gate, a source, and a drain terminal, the driver circuit receives the control signal at the gate terminal for controlling the stator winding phase current.

3. The current feedback amplifier circuit of claim 2, wherein the driver circuit serves as a low side driver.

4. The current feedback amplifier circuit of claim 2, further comprising:
a plurality of first stage current sense amplifiers and wherein the first stage current sense amplifier is one of the plurality of first stage current sense amplifiers, each one of the plurality of first stage current sense amplifiers is operable to detect a stator winding phase current flowing through a corresponding phase of the polyphase stator winding and to generate an equalized sense current in response, the equalized sense current related to the stator winding phase current; and
a switch for selectively coupling the second stage current sense amplifier to each one of the first stage current sense amplifiers to allow the second stage current sense amplifier to receive the equalized sense current from the coupled first stage current sense amplifier.

5. The current feedback amplifier circuit of claim 4, wherein each one of the plurality of first stage current sense amplifiers includes a sense current mirror circuitry to generate the sense current, and an equalized sense current mirror circuitry having a programmably adjustable phase trim device and operable to receive the sense current and to generate the equalized sense current in response, the sense current mirror circuitry and the equalized sense current mirror circuitry are implemented using field-effect transistors, the second stage current sense amplifier includes a reference current mirror circuitry having a programmably adjustable amplitude trim device and operable to generate the amplitude adjusted reference current, and a mirror circuitry operable to provide the amplitude adjusted reference current and the equalized sense current to a summing node for the comparing to generate the control signal, the current feedback amplifier further comprising:
a memory device for storing equalization settings for each one of the programmably adjustable phase trim devices, and to store amplitude settings for the programmably adjustable amplitude trim device.

6. The current feedback amplifier circuit of claim 1, further comprising:
a switch for coupling the first stage current sense amplifier to the second stage current sense amplifier.

7. The current feedback amplifier circuit of claim 1, wherein the first stage current sense amplifier includes a sense current mirror circuitry operable to generate a sense current that is used to generate the equalized sense current.

8. The current feedback amplifier circuit of claim 1, wherein the first stage current sense amplifier includes a sense current mirror circuitry for generating a sense current, and an equalized sense current mirror circuitry having a phase trim device and operable to receive the sense current and to generate the equalized sense current in response.

9. The current feedback amplifier circuit of claim 8, wherein the current mirror circuitry, the equalized sense current mirror circuitry, and the phase trim device are implemented using field-effect transistors.

10. The current feedback amplifier circuit of claim 1, wherein the second stage current sense amplifier includes a reference current mirror circuitry having an amplitude trim device and operable to generate the amplitude adjusted reference current, and a mirror circuitry for providing the amplitude adjusted reference current and the equalized sense current to a summing node to perform the comparison to generate the control signal.

11. The current feedback amplifier circuit of claim 10, wherein the reference current mirror circuitry and the mirror circuitry are implemented using field-effect transistors.

12. The current feedback amplifier circuit of claim 1, wherein the polyphase direct current motor is a three-phase direct current motor having a three-phase stator winding coupled in a "Y" configuration.

13. The current feedback amplifier circuit of claim 1, wherein the driver circuit is a power field-effect transistor having a gate, a source, and a drain terminal, the driver circuit serves as a low side driver and receives the control signal at the gate terminal for controlling the stator winding phase current, the first stage current sense amplifier includes a sense current mirror circuitry to generate the sense current, and an equalized sense current mirror circuitry having a phase trim device and for receiving the sense current and to generate the equalized sense current in response, the sense current mirror circuitry and the equalized sense current mirror circuitry are implemented using field-effect transistors, the second stage current sense amplifier includes a reference current mirror circuitry having an amplitude trim device and operable to generate the amplitude adjusted reference current, and a mirror circuitry for providing the amplitude adjusted reference current and the equalized sense current to a summing node for the comparing to generate the control signal, the reference current mirror circuitry and the mirror circuitry are implemented using field-effect transistors, the current feedback amplifier further comprising:
a switch for coupling the first stage current sense amplifier to the second stage current sense amplifier.

14. A method for controlling a stator winding phase current in any one of a plurality of stator winding current flow paths of a polyphase stator winding, comprising the steps of:
detecting a stator winding phase current flowing in a stator winding current flow path;
generating a sense current that is related to the stator winding phase current;
equalizing the sense current, using phase trim circuitry, to generate an equalized sense current;
adjusting a reference current, using an amplitude trim circuitry, to generate an amplitude trimmed reference current;
comparing the equalized sense current to the amplitude trimmed reference current to generate a control signal; and
providing the control signal to a driver circuit used to control the stator winding phase current.

15. The method of claim 14, wherein the driver circuit is a field-effect transistor having a gate, a source, and a drain terminal and coupled to the low side of the stator winding current flow path to allow the stator winding phase current to flow through the channel of the driver circuit, and wherein the control signal is provided to the gate terminal of the driver circuit for controlling the stator winding phase current.

16. The method of claim 14, wherein the detecting a stator winding phase current step and the generating a sense current step include the use of current mirror circuitry.

17. The method of claim 14, wherein the equalizing the sense current step and the adjusting a reference current step include using programmably adjustable trim circuitry.

18. A method for substantially equalizing stator winding currents in each of a plurality of stator winding current flow paths of a polyphase stator winding used in a polyphase direct current motor, the method comprising the steps of:

measuring a first stator winding current in a first stator winding current flow path during a first steady state operation;

measuring a stator winding current in each one of the remaining plurality of stator winding current flow paths during respective steady state operations;

adjusting the stator winding current in each one of the remaining plurality of stator winding current flow paths during respective steady state operations to substantially equal the first stator winding current; and adjusting the amplitude of a stator winding current to a desired level.

19. The method of claim 18, wherein the measuring a first stator winding current step and the measuring a stator winding current in each one of the remaining plurality of stator winding current flow paths step include using current mirror configurations to sense the stator winding current flowing through a stator winding driver circuit.

20. The method of claim 19, wherein the adjusting the stator winding current step includes selectively coupling at least one active device having a current path in parallel with the stator winding driver circuit for each stator winding current to ensure that each stator winding current is substantially equal to the first stator winding current.

21. The method of claim 20, wherein the adjusting the amplitude step includes selectively coupling at least one active device having a current path in parallel with the stator winding driver circuit to ensure that all of the stator winding currents are at the desired level.

22. The method of claim 21, wherein the stator winding driver circuit serves as a low side driver and is implemented as a power field-effect transistor.

23. The method of claim 19, wherein the adjusting the stator winding current step includes programming a programmably adjustable phase trim device, and the adjusting the amplitude step include programming a programmably adjustable amplitude trim device.

* * * * *